(12) United States Patent
Weston et al.

(10) Patent No.: US 12,168,441 B2
(45) Date of Patent: Dec. 17, 2024

(54) VEHICLE TRAILER CONTROL

(71) Applicant: Ford Global Technologies, LLC, Dearborn, MI (US)

(72) Inventors: Keith Weston, Canton, MI (US); Andrew Denis Lewandowski, Sterling Heights, MI (US); Jordan Barrett, Milford, MI (US); Brendan Francis Diamond, Grosse Pointe, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 17/749,185

(22) Filed: May 20, 2022

(65) Prior Publication Data

US 2023/0373486 A1   Nov. 23, 2023

(51) Int. Cl.
*B60W 10/00* (2006.01)
*B60W 30/18* (2012.01)
*B60W 50/14* (2020.01)
*B62D 15/02* (2006.01)

(52) U.S. Cl.
CPC ...... *B60W 30/18036* (2013.01); *B60W 50/14* (2013.01); *B62D 15/029* (2013.01); *B60W 2050/146* (2013.01); *B60W 2510/1005* (2013.01); *B60W 2520/06* (2013.01); *B60W 2520/22* (2013.01); *B60W 2530/203* (2020.02); *B60W 2710/18* (2013.01); *B60W 2720/10* (2013.01)

(58) Field of Classification Search
CPC ........... B60W 30/18036; B60W 50/14; B60W 2050/146; B60W 2510/1005; B60W 2520/06; B60W 2520/22; B60W 2530/203; B60W 2710/18; B60W 2720/10; B60W 10/00; B62D 15/029; B62D 15/0285
USPC .......................................................... 701/23
See application file for complete search history.

(56) References Cited

U.S. PATENT DOCUMENTS

| | | | |
|---|---|---|---|
| 2,988,957 A * | 6/1961 | Kotora, Jr. ............... | B60R 1/025 74/487 |
| 3,166,630 A * | 1/1965 | Esslinger ................ | B60R 1/025 248/479 |
| 3,640,608 A * | 2/1972 | McKee ................... | B60R 1/025 359/843 |
| 3,640,609 A * | 2/1972 | McKee ................... | B60R 1/025 359/843 |
| 9,340,228 B2 | 5/2016 | Xu et al. | |
| 10,173,722 B2 | 1/2019 | Pourrezaei Khaligh et al. | |
| 10,663,581 B2 | 5/2020 | Decker et al. | |
| 10,942,271 B2 | 3/2021 | Han et al. | |
| 11,066,100 B2 | 7/2021 | Rhode et al. | |

(Continued)

*Primary Examiner* — Shardul D Patel
(74) *Attorney, Agent, or Firm* — Frank A. MacKenzie; Bejin Bieneman PLC (57) ABSTRACT

A computer includes a processor and a memory, and the memory stores instructions executable by the processor to, in response to a vehicle towing a trailer being in reverse, determine a relative orientation of the trailer to the vehicle; while the vehicle is in reverse, in response to the relative orientation exceeding a threshold, brake the vehicle; and then, upon receiving an operator input, permit the vehicle to travel in reverse with the relative orientation exceeding the threshold.

20 Claims, 4 Drawing Sheets

(56) References Cited

U.S. PATENT DOCUMENTS

| | | | |
|---|---|---|---|
| 2004/0199319 A1* | 10/2004 | Lubischer | B60W 30/18 |
| | | | 701/70 |
| 2009/0271078 A1* | 10/2009 | Dickinson | G06V 10/255 |
| | | | 701/51 |
| 2012/0271512 A1* | 10/2012 | Rupp | B62D 15/027 |
| | | | 701/1 |
| 2019/0279004 A1* | 9/2019 | Kwon | G05D 1/249 |
| 2020/0017143 A1* | 1/2020 | Gali | G06T 7/70 |
| 2021/0027107 A1* | 1/2021 | Pekelny | G06N 3/045 |

* cited by examiner

VEHICLE TRAILER CONTROL

BACKGROUND

Motor vehicles are sometimes used to tow trailers. A trailer is an unpowered vehicle outfitted to be towed by a powered vehicle. A trailer can be unpowered by lacking a propulsion or can be temporarily unpowered, e.g., by being in a neutral gear. Trailers can be used to transport goods, provide living space, etc.

DETAILED DESCRIPTION

This disclosure provides techniques for controlling a vehicle towing a trailer, in particular when traveling in reverse. One potential concern with traveling in reverse while towing a trailer is "jackknifing," which occurs when the trailer is highly articulated relative to the vehicle, e.g., forming an acute angle with the vehicle. The vehicle can include a computer programmed to, in response to the vehicle towing the trailer and being in reverse, determine a relative orientation of the trailer to the vehicle; while the vehicle is in the reverse gear, in response to the relative orientation exceeding a threshold, brake the vehicle; and then, upon receiving an operator input, permit the vehicle to travel in reverse with the relative orientation exceeding the threshold. This vehicle computer can actuate components to avoid contacting the trailer while still permitting control of the vehicle by the operator.

A computer includes a processor and a memory, and the memory stores instructions executable by the processor to, in response to a vehicle towing a trailer being in a reverse gear, determine a relative orientation of the trailer to the vehicle; while the vehicle is in the reverse gear, in response to the relative orientation exceeding a threshold, brake the vehicle; and then, upon receiving an operator input, permit the vehicle to travel in reverse with the relative orientation exceeding the threshold.

The instructions may further include instructions to limit a speed of the vehicle when permitting the vehicle to travel in reverse with the relative orientation exceeding the threshold.

The instructions may further include instructions to, in response to the vehicle traveling straight forward, determine a baseline relative orientation of the trailer to the vehicle, and determining the relative orientation of the trailer to the vehicle may include determining the relative orientation as a deviation from the baseline relative orientation.

The instructions may further include instructions to determine the threshold based on a speed of the vehicle. The threshold may become easier to exceed as the speed of the vehicle increases.

The instructions may further include instructions to determine the threshold based on a shape of the trailer. The instructions may further include instructions to determine the shape of the trailer based on sensor data.

The relative orientation may be a hitch angle of the trailer relative to the vehicle.

The relative orientation may be a distance from the trailer to a point on the vehicle, and the point may be laterally offset from a hitch connecting the trailer to the vehicle.

The threshold may be a first threshold, and the instructions may further include instructions to, while the vehicle is in the reverse gear, in response to the relative orientation exceeding a second threshold, output an alert. The second threshold may be easier to exceed than the first threshold.

The instructions may further include instructions to, after braking the vehicle in response to the relative orientation exceeding the threshold, upon failing to receive the operator input, continue braking the vehicle until the vehicle is shifted out of the reverse gear.

The instructions may further include instructions to, after braking the vehicle in response to the relative orientation exceeding the threshold, upon failing to receive the operator input, output guidance indicating how to straighten the trailer relative to the vehicle.

The guidance may include torque applied to a steering wheel of the vehicle.

The guidance may include a message outputted to a screen of the vehicle.

The instructions may further include instructions to, while the vehicle is in the reverse gear, in response to the relative orientation exceeding the threshold, output a prompt for the operator input.

The operator input may be a throttle override.

Determining the relative orientation may be based on sensor data. The instructions may further include instructions to receive the sensor data at least from a plurality of ultrasonic sensors.

A method includes, in response to a vehicle towing a trailer being in a reverse gear, determining a relative orientation of the trailer to the vehicle; while the vehicle is in the reverse gear, in response to the relative orientation exceeding a threshold, braking the vehicle; and then, upon receiving an operator input, permitting the vehicle to travel in reverse with the relative orientation exceeding the threshold.

With reference to the Figures, wherein like numerals indicate like parts throughout the several views, a computer 105 includes a processor and a memory, and the memory stores instructions executable by the processor to, in response to a vehicle 100 towing a trailer 200 being in reverse, determine a relative orientation of the trailer 200 to the vehicle 100; while the vehicle 100 is in reverse, in response to the relative orientation exceeding a threshold, brake the vehicle 100; and then, upon receiving an operator input, permit the vehicle 100 to travel in reverse with the relative orientation exceeding the threshold.

Figure 1:
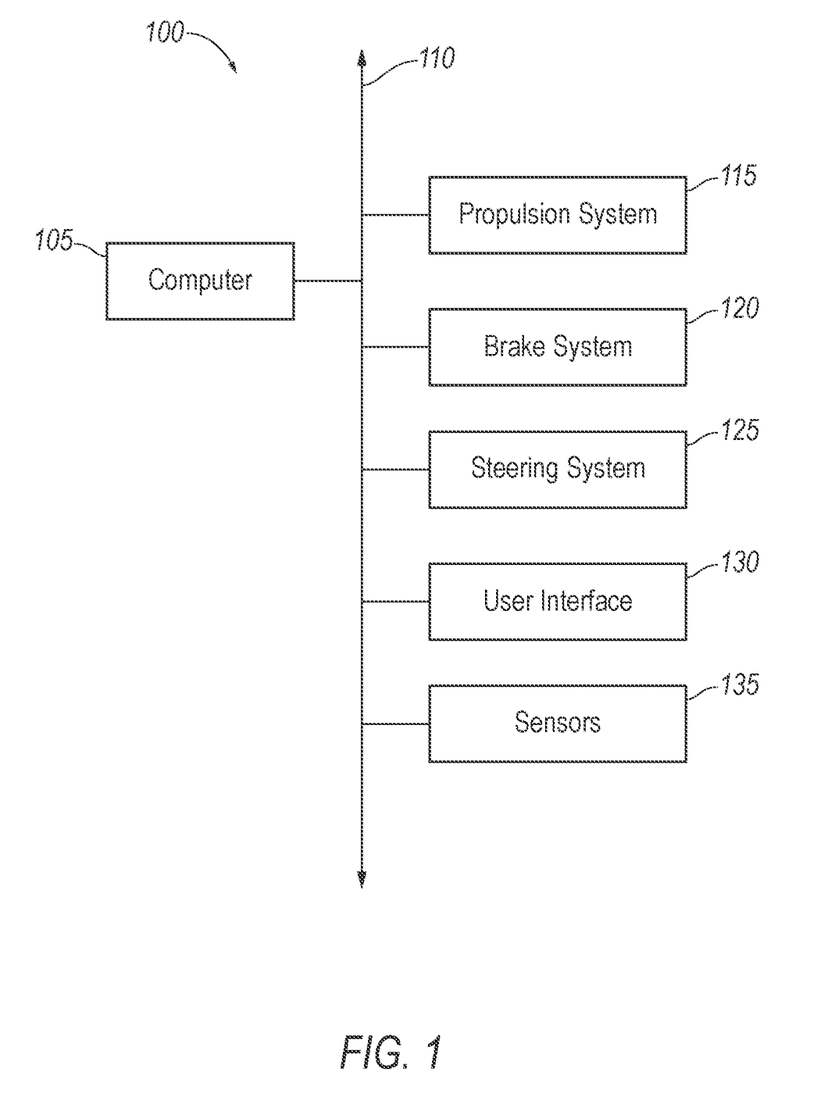
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to a propulsion system 115, a brake system 120, a steering system 125, a user interface 130, sensors 135, and other components via the communications network 110.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

The user interface 130 presents information to and receives information from an occupant of the vehicle 100. The user interface 130 may be located, e.g., on an instrument panel in a passenger cabin of the vehicle 100, or wherever may be readily seen by the occupant. The user interface 130 may include dials, digital readouts, screens, speakers, and so on for providing information to the occupant, e.g., human-machine interface (HMI) elements such as are known. The user interface 130 may include buttons, knobs, keypads, microphone, and so on for receiving information from the occupant.

The sensors 135 may provide data about operation of the vehicle 100, for example, wheel speed, wheel orientation, and engine and transmission data (e.g., temperature, fuel consumption, etc.). The sensors 135 may detect the location and/or orientation of the vehicle 100. For example, the sensors 135 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 135 may detect the external world, e.g., objects and/or characteristics of surroundings of the vehicle 100, such as other vehicles, road lane markings, traffic lights and/or signs, pedestrians, etc. For example, the sensors 135 may include radar sensors 205, ultrasonic sensors 210, scanning laser range finders, light detection and ranging (LIDAR) devices, and image processing sensors such as cameras 215.

Figure 2:
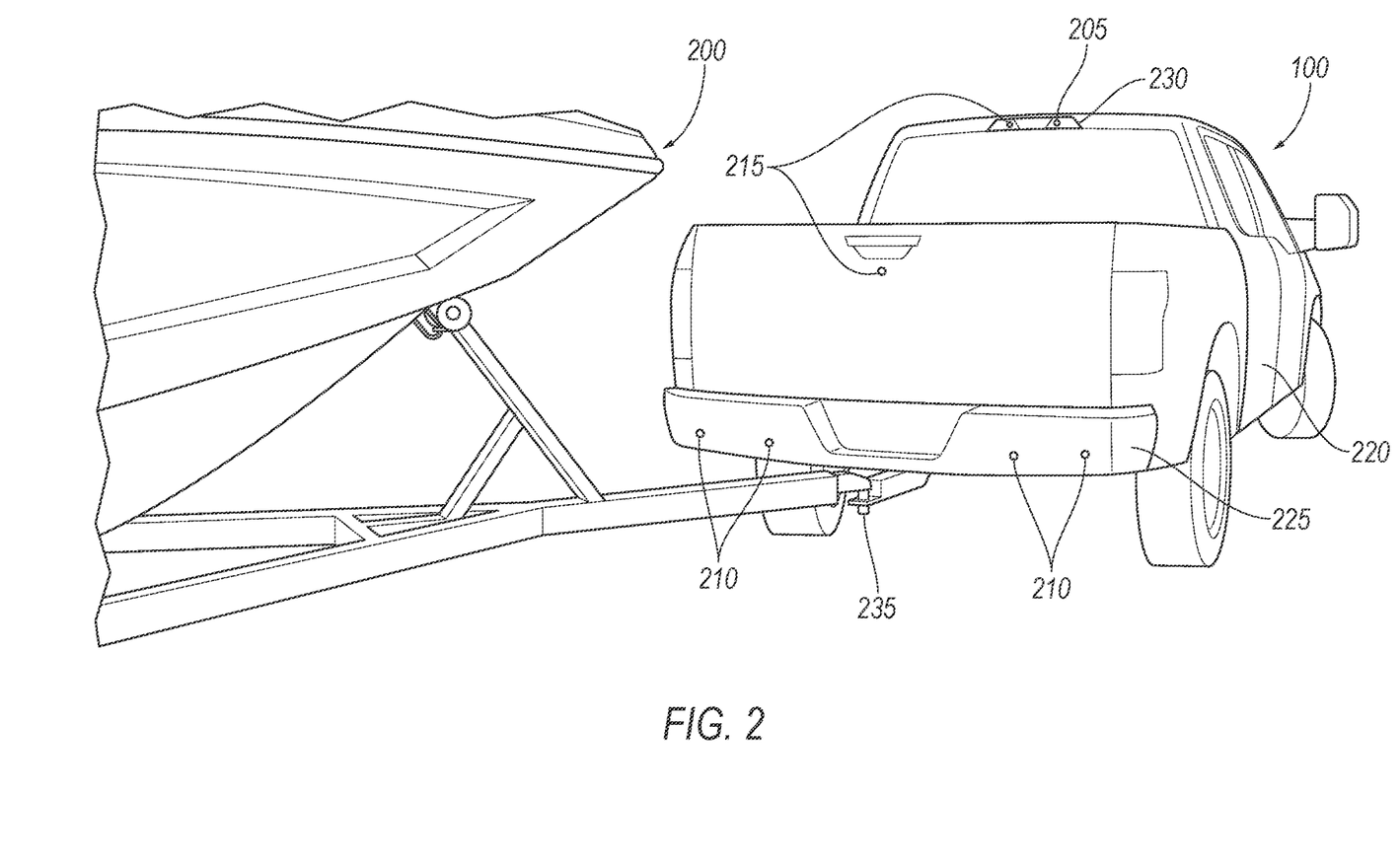
FIG. 2 is a rear perspective view of an example trailer hitched to the vehicle.

With reference to FIG. 2, the sensors 135, e.g., the radar sensors 205, ultrasonic sensors 210, and cameras 215, can be mounted to a body 220 of the vehicle 100 and fixed relative to the body 220 of the vehicle 100. The sensors 135 can include rear-facing sensors 135. For example, the sensors 135 can include a plurality of ultrasonic sensors 210 mounted to a bumper 225 of the vehicle 100, arrayed laterally relative to the vehicle 100, and facing rearward. The sensors 135 can include rearward-facing cameras 215 mounted to the bumper 225 and to a fixture 230 for a center high-mounted stop lamp (CHMSL). The sensors 135 can include a radar sensor 205 mounted to the fixture 230 for the CHMSL.

The ultrasonic sensors 210 measure distances to features of the environment by emitting ultrasonic sound waves and converting the reflected sound into an electrical signal. The ultrasonic sensors 210 may be any suitable type, e.g., a field of view with a comparatively wide horizontal angle and narrow vertical angle.

The cameras 215 can detect electromagnetic radiation in some range of wavelengths. For example, the cameras 215 may detect visible light, infrared radiation, ultraviolet light, or some range of wavelengths including visible, infrared, and/or ultraviolet light. For example, the cameras 215 can be a charge-coupled devices (CCD), complementary metal oxide semiconductors (CMOS), or any other suitable type.

The radar sensor 205 transmits radio waves and receives reflections of those radio waves to detect physical objects in the environment. The radar sensor 205 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

The vehicle 100 can be towing the trailer 200. The trailer 200 can be an unpowered vehicle outfitted to be towed by the vehicle 100. The trailer 200 can be unpowered by lacking a propulsion or can be temporarily unpowered, e.g., by being in a neutral gear. The trailer 200 can be used to transport goods, provide living space, etc.

The trailer 200 can be hitched to the vehicle 100. For example, the vehicle 100 and the trailer 200 can be connected by a tow hitch 235, also referred to as a trailer hitch. The tow hitch 235 can be any suitable type, e.g., a tow ball and socket, a fifth wheel and gooseneck, etc. The tow hitch 235 permits rotation of the trailer 200 relative to the vehicle 100 around a vertical axis, e.g., passing through the tow ball. The tow hitch 235 can rigidly connect the vehicle 100 and the trailer 200 to the point through which the vertical axis passes.

The trailer 200 has a shape, i.e., a geometrical representation of the trailer 200, and the computer 105 can store the shape in memory. As stored by the computer 105, the shape can be two-dimensional, e.g., a footprint of the trailer 200, i.e., a space occupied by the trailer 200 as seen from above as in FIG. 3. Alternatively, the shape can be three-dimensional. The shape can include all of the trailer 200 or part of the trailer 200, e.g., only the front end and sides of the trailer 200 but not the rear of the trailer 200. The shape can vary based on the type of trailer 200, e.g., if the trailer 200 is a boat trailer carrying a boat as shown in FIG. 2, the sides of the trailer 200 can be more swept back and the width can increase more slowly from the front of the trailer 200 to the rear of the trailer 200, whereas a cargo trailer can have a boxier front end with a large width close to the tow hitch 235. The shape of the trailer 200 can affect how much the relative orientation of the trailer 200 can change before the trailer 200 contacts the vehicle 100, e.g., a boxier trailer 200 can contact the vehicle 100 at a smaller change in relative orientation from a centered position than a more swept-back trailer 200 can.

The computer 105 can be programmed to determine the shape of the trailer 200 based on sensor data, e.g., data received from the sensors 135. For example, the computer 105 can determine the shape from the distances returned by the ultrasonic sensors 210 and/or the radar sensor 205. The shape can be represented as a point cloud based on the data from the ultrasonic sensors 210 and/or the radar sensors 205.

Alternatively or additionally, the computer 105 can determine the shape from image data returned by the cameras 215. For example, if the sensors 135 include multiple, laterally spaced rear-facing cameras 215, the computer 105 can determine the shape of the trailer 200 stereoscopically. For another example, the computer 105 can identify the type of the trailer 200 using conventional image-recognition techniques, e.g., a convolutional neural network programmed to accept images as input and output an identified type of trailer 200. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type, and the final output is the type with the highest score. The computer 105 can store corresponding shapes for the types of trailers 200 in memory.

Figure 3:
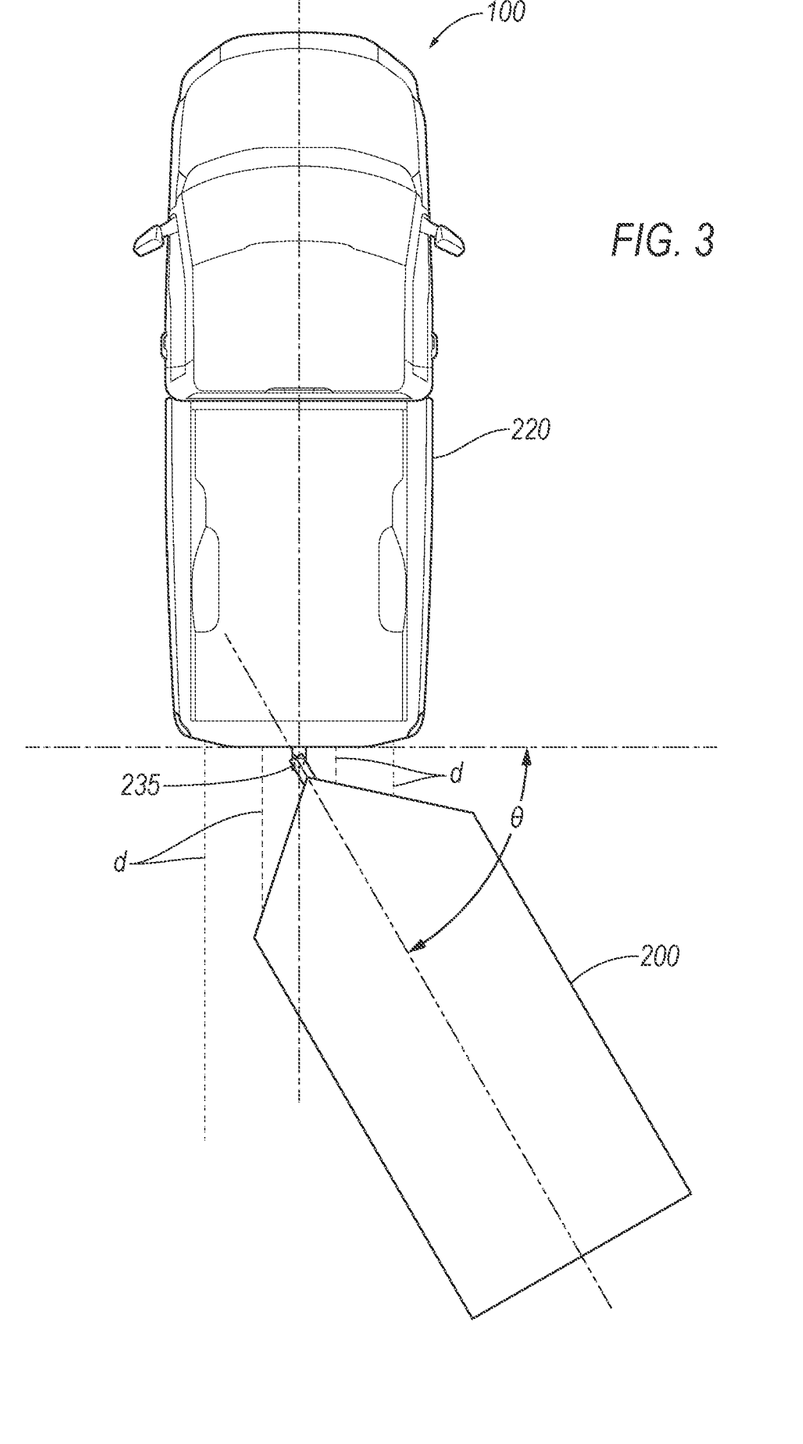
FIG. 3 is a top diagrammatic view of the vehicle and the trailer.

With reference to FIG. 3, the trailer 200 has a relative orientation with respect to the vehicle 100. The relative orientation is a measure of the articulation of the trailer 200 around the tow hitch 235 relative to the vehicle 100, i.e., how much the trailer 200 is rotated about the tow hitch 235, holding the vehicle 100 constant, in a horizontal plane.

For example, the relative orientation can be a hitch angle of the trailer 200 relative to the vehicle 100. The hitch angle $\theta$ can be measured in the horizontal plane between a longitudinal axis of the trailer 200 and a lateral axis at the bumper 225 of the vehicle 100, as shown in FIG. 3. Alternatively, the hitch angle can be measured between the longitudinal axis of the trailer 200 and a longitudinal axis of the vehicle 100.

For another example, the relative orientation can be one or more distances d from the trailer 200 to respective points on the vehicle 100. The distances d can be measured parallel to the longitudinal axis of the vehicle 100. The points can be laterally offset from the tow hitch 235 connected the trailer 200 to the vehicle 100. For example, the points can be the locations of the ultrasonic sensors 210, and the distances can be the range measurements returned by the ultrasonic sensors 210.

The computer 105 can be determined to determine a baseline relative orientation of the trailer 200 to the vehicle 100 (as described immediately below) in response to the vehicle 100 traveling straight forward. The computer 105 can be programmed to determine that the vehicle 100 is traveling straight forward. For example, the computer 105 can determine that the vehicle 100 is traveling straight forward based on data received from the propulsion system 115 indicating that the propulsion system 115 is in a forward gear and a speed of the vehicle 100 is positive and data received from the steering system 125 indicating that that steering angle is within a margin of error from straight ahead. For another example, the computer 105 can determine that the vehicle 100 is traveling straight forward based on data from the sensors 135, e.g., from a GPS sensor, indicating that positions of the vehicle 100 are following a straight line, which can be combined with map data indicating that the vehicle 100 is traveling on a straight road.

The computer 105 can be programmed to determine the baseline relative orientation of the trailer 200 to the vehicle 100. The baseline relative orientation can occur when the longitudinal axes of the vehicle 100 and the trailer 200 are aligned and the trailer 200 is centered behind the vehicle 100. For example, the computer 105 can determine the baseline relative orientation by storing the distances to the trailer 200 determined by the ultrasonic sensors 210.

The computer 105 can be programmed to, in response to the vehicle 100 towing the trailer 200 being in reverse, determine the relative orientation of the trailer 200 to the vehicle 100. Being in reverse means that the vehicle 100 is in a state in which accelerating the vehicle 100 will cause the vehicle 100 to travel in reverse, i.e., backwards, e.g., the vehicle 100 is in a reverse gear. The relative orientation can be determined as a deviation from the baseline relative orientation, i.e., how far the trailer 200 has articulated about the tow hitch 235 compared to the baseline relative orientation. The computer 105 can determine the relative orientation based on sensor data, e.g., from the ultrasonic sensors 210. For example, the relative orientation can include differences of the distances returned by the ultrasonic sensor 210 from the distances d of the baseline relative orientation. Alternatively or additionally, the computer 105 can use the distances d to geometrically determine the hitch angle $\theta$.

The computer 105 can be programmed to determine one or more thresholds for the relative orientation, e.g., a first threshold and a second threshold. As described below, the first threshold can be used for braking the vehicle 100, and the second threshold can be used for outputting an alert to an operator of the vehicle 100. The computer 105 can determine the thresholds based on the speed of the vehicle 100 and/or the shape of the trailer 200. For example, the computer 105 can determine a contact relative orientation at which the trailer 200 would contact the vehicle 100 based on the shape of the trailer 200. If the shape of the trailer 200 stored in memory is three-dimensional, the computer 105 may account for the pitch and/or roll of the vehicle 100 and/or the trailer 200 when determining the contact relative orientation. Then, the computer 105 can set the thresholds at respective relative orientations that are offset from the contact relative orientation toward the baseline relative orientation by respective margins. The second threshold can be easier to exceed than the first threshold, e.g., by having a larger margin. The thresholds thus become easier to exceed as the trailer 200 becomes boxier, e.g., as the distances d measured by the ultrasonic sensors 210 in the baseline relative orientation become smaller. The margins can vary based on the speed. The thresholds can become easier to exceed as the speed of the vehicle 100 increases, e.g., the margins can increase with the speed.

The computer 105 can be programmed to output an alert to the operator in response to the relative orientation of the trailer 200 exceeding the second threshold. The relative orientation can exceed the second threshold when the relative orientation of the trailer 200 is more articulated away from the baseline relative orientation than the second threshold is. For example, the relative orientation can exceed the second threshold when the hitch angle θ decreases below a threshold angle $\theta_{th,2}$ or when one of the distances d on one side decreases below a threshold distance $\theta_{th,2}$. The computer 105 can output the alert to the operator via the user interface 130. For example, the user interface 130 can play a sound such as a chime or beep and can display a message indicating that the trailer 200 may be close to contacting the vehicle 100.

The computer 105 can be programmed to brake the vehicle 100 in response to the relative orientation exceeding the first threshold. The relative orientation can exceed the first threshold when the relative orientation of the trailer 200 is more articulated away from the baseline relative orientation than the first threshold is. For example, the relative orientation can exceed the first threshold when the hitch angle θ decreases below a threshold angle $\theta_{th,1}$ or when one of the distances d on one side decreases below a threshold distance $d_{th,1}$. The computer 105 can brake the vehicle 100 by actuating the brake system 120. The computer 105 can actuate the brake system 120 so as to stop the vehicle 100, e.g., by applying a large, immediate braking force or by ramping up the braking force to a sufficiently large braking force to stop the vehicle 100.

The computer 105 can be programmed to then, after braking the vehicle 100 in response to the relative orientation exceeding the first threshold, output a prompt for an operator input, e.g., via the user interface 130. For example, the computer 105 can display a message indicating that the vehicle 100 has been stopped to avoid contact between the vehicle 100 and the trailer 200, and the computer 105 can display a plurality of possible operator inputs, e.g., "Override," "Straighten," "Dismiss," etc. The operator can select to override the braking, i.e., to continue traveling in reverse, by selecting the "Override" option or by providing a throttle input, i.e., by pressing the accelerator pedal beyond a threshold level. The operator can select not to override by selecting one of the other possible operator inputs or by failing to provide an operator input for a predetermined time after displaying the operator inputs.

The computer 105 can be programmed to, upon receiving the operator input to override the braking, permit the vehicle 100 to travel in reverse with the relative orientation exceeding the threshold. In other words, once the operator has selected the operator input to override the braking, the computer 105 does not actuate the brake system 120 in response to the relative orientation exceeding the first threshold. The computer 105 can be programmed to limit the speed of the vehicle 100 when permitting the vehicle 100 to travel in reverse with the relative orientation exceeding the threshold, e.g., by limiting the speed that the propulsion system 115 can achieve to a slow speed such as 5 miles per hour.

The computer 105 can be programmed to, upon receiving the operator input not overriding the braking or upon failing to receive the operator input for the predetermined time, output guidance indicating how to straighten the trailer 200 relative to the vehicle 100. The guidance can include messages outputted to a screen of the user interface 130, e.g., instructing the operator to shift the vehicle 100 out of reverse to, e.g., drive, first gear, etc. and how to turn the steering wheel. The computer 105 can continue braking the vehicle 100, e.g., actuate the brake system 120 to maintain the braking force, until the vehicle 100 is shifted out of reverse. Alternatively or additionally, the guidance can include torques successively applied to the steering wheel indicating how to turn the steering wheel. The torques can be insufficient to turn the steering wheel by themselves but strong enough for the operator to feel resistance when turning the steering against the guidance. The computer 105 can determine the instructions included in the guidance based on the relative orientation of the trailer 200 with respect to the vehicle 100 and known kinematics of trailer 200 coupled to vehicles 100.

Figure 4:
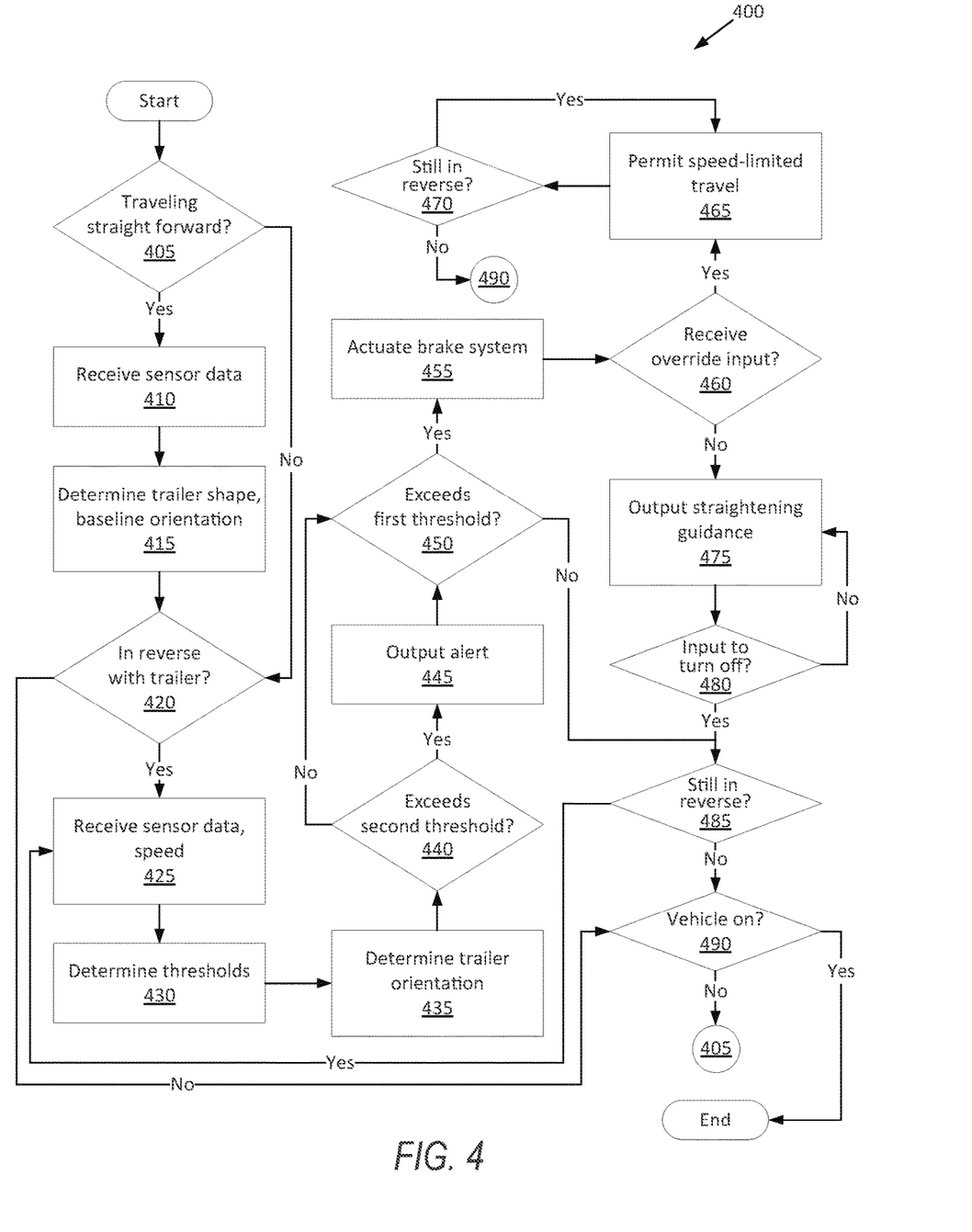
FIG. 4 is a process flow diagram of an example process for controlling the vehicle while towing the trailer.

FIG. 4 is a process flow diagram illustrating an exemplary process 400 for controlling the vehicle 100 while towing the trailer 200. The memory of the computer 105 stores executable instructions for performing the steps of the process 400 and/or programming can be implemented in structures such as mentioned above. As a general overview of the process 400, when the vehicle 100 is traveling straight forward, the computer 105 receives sensor data and determines the shape and baseline relative orientation of the trailer 200. When the vehicle 100 is traveling in reverse, the computer 105 receives the speed and sensor data, determines the thresholds and relative orientation, outputs the alert if the relative orientation exceeds the second threshold, and brakes the vehicle 100 if the relative orientation exceeds the first threshold. If the computer 105 receives an operator input to override the braking, the computer 105 permits the vehicle 100 to travel in reverse with the relative orientation exceeding the threshold while limiting the speed. Otherwise, the computer 105 outputs the guidance for straightening the vehicle 100 and trailer 200 until the operator dismisses the guidance. The process 400 can continue for as long as the vehicle 100 remains on.

The process 400 begins in a decision block 405, in which the computer 105 determines whether the vehicle 100 is traveling straight forward, as described above. In response to the vehicle 100 traveling straight forward, the process 400 proceeds to a block 410. Otherwise, the process 400 proceeds to a decision block 420.

In the block 410, the computer 105 receives data from the sensors 135, as described above.

Next, in a block 415, the computer 105 determines the shape of the trailer 200 and the baseline relative orientation of the trailer 200 to the vehicle 100, as described above. After the block 415, the process 400 proceeds to the decision block 420.

In the decision block 420, the computer 105 determines whether the vehicle 100 is in reverse and towing a trailer 200. The computer 105 can receive the gear of the vehicle 100 from the propulsion system 115. The computer 105 can determine whether the vehicle 100 is towing the trailer 200 based on, e.g., applying object recognition to data received from the camera 215 as described above, detecting the responsiveness of the propulsion system 115 to an instruction to accelerate, etc. In response to the vehicle 100 towing the trailer 200 and being in reverse, the process 400 proceeds to a block 425. If the vehicle 100 is not in reverse or the vehicle 100 is not towing the trailer 200, the process 400 proceeds to a decision block 490.

In the block 425, the computer 105 receives the speed of the vehicle 100 and data from the sensors 135.

Next, in a block 430, the computer 105 determines the first threshold and the second threshold, as described above.

Next, in a block 435, the computer 105 determines the relative orientation of the trailer 200 to the vehicle 100, as described above.

Next, in a decision block 440, the computer 105 determines whether the relative orientation has exceeded the second threshold, as described above. In response to the relative orientation exceeding the second threshold, the process 400 proceeds to a block 445. Otherwise, the process 400 proceeds to a decision block 450.

In the block 445, the computer 105 outputs the alert, as described above. After the block 445, the process 400 proceeds to the decision block 450.

In the decision block 450, the computer 105 determines whether the relative orientation has exceeded the first threshold, as described above. In response to the relative orientation exceeding the first threshold, the process 400 proceeds to a block 455. Otherwise, the process 400 proceeds a decision block 485.

In the block 455, the computer 105 brakes the vehicle 100 and outputs the prompt for the operator input, as described above.

Next, in a decision block 460, the computer 105 determines whether the computer 105 received the operator input overriding the braking, as described above. Upon receiving the operator input overriding the braking, the process 400 proceeds to a block 465. Upon receiving a different operator input or failing to receive the operator input within the predetermined time, the process 400 proceeds to block 475.

In the block 465, the computer 105 permits the vehicle 100 to travel in reverse with the relative orientation exceeding the threshold while limiting the speed of the vehicle 100, as described above.

Next, in a decision block 470, the computer 105 determines whether the vehicle 100 is still in reverse. While the vehicle 100 is in reverse, the process 400 returns to the block 465 to continue permitting reverse travel by the vehicle 100. Otherwise, the process 400 proceeds to the decision block 490.

In the block 475, the computer 105 outputs the guidance indicating how to straighten the trailer 200 relative to the vehicle 100, as described above.

Next, in a decision block 480, the computer 105 determines whether the computer 105 has received an operator input to stop the guidance. The operator input can be provided by selecting an option from the user interface 130 indicating to stop the guidance. The operator input can also be provided by turning off the vehicle 100. Upon receiving the operator input to stop the guidance, the process 400 proceeds to the decision block 485. Otherwise, the process 400 returns to the block 475 to continue providing the guidance.

In the decision block 485, the computer 105 determines whether the vehicle 100 is still in reverse. While the vehicle 100 is in reverse, the process 400 returns to the block 425 to continue monitoring the relative orientation of the trailer 200 to the vehicle 100. Otherwise, the process 400 proceeds to the decision block 490.

In the decision block 490, the computer 105 determines whether the vehicle 100 is still on. If so, the process 400 returns to the decision block 405 to determine the state of the vehicle 100. Otherwise, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   in response to a vehicle towing a trailer being in a reverse gear, determine a relative orientation of the trailer to the vehicle;
   while the vehicle is in the reverse gear, in response to the relative orientation exceeding a threshold, brake the vehicle without a braking input from an operator of the vehicle; and
   while the vehicle is braked as a result of the relative orientation exceeding the threshold, upon receiving an operator input, permit the vehicle to continue to travel in reverse with the relative orientation exceeding the threshold.

2. The computer of claim 1, wherein the instructions further include instructions to limit a speed of the vehicle when permitting the vehicle to travel in reverse with the relative orientation exceeding the threshold.

3. The computer of claim 1, wherein the instructions further include instructions to, in response to the vehicle traveling straight forward, determine a baseline relative orientation of the trailer to the vehicle, wherein determining the relative orientation of the trailer to the vehicle includes determining the relative orientation as a deviation from the baseline relative orientation.

4. The computer of claim 1, wherein the instructions further include instructions to determine the threshold based on a speed of the vehicle.

5. The computer of claim 4, wherein the threshold becomes easier to exceed as the speed of the vehicle increases.

6. The computer of claim 1, wherein the instructions further include instructions to determine the threshold based on a shape of the trailer.

7. The computer of claim 6, wherein the instructions further include instructions to determine the shape of the trailer based on sensor data.

8. The computer of claim 1, wherein the relative orientation is a hitch angle of the trailer relative to the vehicle.

9. The computer of claim 1, wherein the relative orientation is a distance from the trailer to a point on the vehicle, the point being laterally offset from a hitch connecting the trailer to the vehicle.

10. The computer of claim 1, wherein the threshold is a first threshold, and the instructions further include instructions to, while the vehicle is in the reverse gear, in response to the relative orientation exceeding a second threshold, output an alert.

11. The computer of claim 10, wherein the second threshold is easier to exceed than the first threshold.

12. The computer of claim 1, wherein the instructions further include instructions to, after braking the vehicle in response to the relative orientation exceeding the threshold, upon failing to receive the operator input, continue braking the vehicle until the vehicle is shifted out of the reverse gear.

13. The computer of claim 1, wherein the instructions further include instructions to, after braking the vehicle in response to the relative orientation exceeding the threshold, upon failing to receive the operator input, output guidance indicating how to straighten the trailer relative to the vehicle.

14. The computer of claim 13, wherein the guidance includes torque applied to a steering wheel of the vehicle.

15. The computer of claim 13, wherein the guidance includes a message outputted to a screen of the vehicle.

16. The computer of claim 1, wherein the instructions further include instructions to, while the vehicle is in the reverse gear, in response to the relative orientation exceeding the threshold, output a prompt for the operator input.

17. The computer of claim 1, wherein the operator input is a throttle override.

18. The computer of claim 1, wherein determining the relative orientation is based on sensor data.

19. The computer of claim 18, wherein the instructions further include instructions to receive the sensor data at least from a plurality of ultrasonic sensors.

20. A method comprising:
   in response to a vehicle towing a trailer being in a reverse gear, determining a relative orientation of the trailer to the vehicle;
   while the vehicle is in the reverse gear, in response to the relative orientation exceeding a threshold, braking the vehicle without a braking input from an operator of the vehicle; and
   while the vehicle is braked as a result of the relative orientation exceeding the threshold, upon receiving an operator input, permitting the vehicle to continue to travel in reverse with the relative orientation exceeding the threshold.

* * * * *